(12) United States Patent
Lange

(10) Patent No.: US 7,844,378 B2
(45) Date of Patent: Nov. 30, 2010

(54) FARM APPARATUS HAVING IMPLEMENT SIDEHILL DRIFT COMPENSATION

(75) Inventor: Arthur F. Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 106 days.

(21) Appl. No.: 11/543,739

(22) Filed: Oct. 5, 2006

(65) Prior Publication Data

US 2008/0086249 A1 Apr. 10, 2008

(51) Int. Cl.
G06G 7/70 (2006.01)
G06G 7/76 (2006.01)

(52) U.S. Cl. .................. 701/50; 701/214; 342/357.06; 180/9.38; 180/9.44; 280/5.507; 280/5.5

(58) Field of Classification Search .................. 701/23, 701/50, 213–214, 221, 41; 342/357.06; 180/9.38, 9.44; 280/5.507, 5.5
See application file for complete search history.

(56) References Cited

U.S. PATENT DOCUMENTS

| 3,465,577 | A |   | 9/1969  | Donovan ............... 73/118.01 |
| D305,338  | S |   | 1/1990  | Baillie ..................... D15/199 |
| 5,170,849 | A |   | 12/1992 | Nikkel et al. ................ 172/6 |
| 5,471,391 | A |   | 11/1995 | Gudat et al. .......... 364/424.07 |
| 5,519,296 | A |   | 5/1996  | Day ........................... 318/587 |
| 5,664,632 | A |   | 9/1997  | Frasier ........................ 172/6 |
| 5,786,789 | A |   | 7/1998  | Janky ....................... 342/357 |
| 5,928,309 | A |   | 7/1999  | Korver et al. ............. 701/214 |
| 5,974,348 | A |   | 10/1999 | Rocks ........................ 701/28 |
| 5,991,694 | A |   | 11/1999 | Gudat et al. .................. 702/2 |
| 6,052,647 | A | * | 4/2000  | Parkinson et al. .......... 701/215 |
| 6,070,539 | A |   | 6/2000  | Flamme et al. ............ 111/177 |
| 6,070,673 | A |   | 6/2000  | Wendte ........................ 172/2 |
| 6,073,070 | A |   | 6/2000  | Diekhans ..................... 701/50 |
| 6,087,984 | A |   | 7/2000  | Keller et al. ............ 342/357.17 |
| 6,088,644 | A |   | 7/2000  | Brandt et al. ................ 701/50 |
| 6,104,339 | A |   | 8/2000  | Nichols ................. 342/357.06 |
| 6,131,062 | A |   | 10/2000 | Nielsen ....................... 701/50 |
| 6,185,492 | B1|   | 2/2001  | Kagawa et al. ............. 701/41 |
| 6,199,000 | B1|   | 3/2001  | Keller et al. ................. 701/50 |
| 6,272,405 | B1|   | 8/2001  | Kubota ....................... 701/23 |
| 6,336,066 | B1|   | 1/2002  | Pellenc et al. ............... 701/50 |
| 6,377,889 | B1|   | 4/2002  | Soest ........................ 701/207 |
| 6,434,462 | B1|   | 8/2002  | Bevly et al. ................. 701/50 |
| 6,470,265 | B1|   | 10/2002 | Tanaka ...................... 701/208 |

(Continued)

FOREIGN PATENT DOCUMENTS

AU 2004320401 B2 * 4/2009

(Continued)

OTHER PUBLICATIONS

A GPS-Reflections Receiver That Computes Doppler/Delay Maps in Real Time; Nogues-Correig, O.; Cardellach Gali, E.; Sanz Campderros, J.; Rius, A.; Geoscience and Remote Sensing, IEEE Transactions on; vol. 45, Issue 1, Jan. 2007 pp. 156-174; Digital Object Identifier 10.1109/TGRS.2006.882257.*

(Continued)

*Primary Examiner*—Cuong H Nguyen

(57) ABSTRACT

An apparatus and method using GPS for dynamically adjusting side-to-side positioning of a farm implement along a geographical path.

26 Claims, 12 Drawing Sheets

U.S. PATENT DOCUMENTS

| | | | |
|---|---|---|---|
| 6,501,422 B1 | 12/2002 | Nichols | 342/357.17 |
| 6,522,948 B1 | 2/2003 | Benneweis | 700/243 |
| 6,553,299 B1 | 4/2003 | Keller | 701/50 |
| 6,553,311 B2 | 4/2003 | Ahearn | 701/213 |
| 6,553,312 B2 | 4/2003 | Upadhyaya et al. | 701/213 |
| 6,580,246 B2 | 6/2003 | Jacobs | 318/568.16 |
| 6,694,260 B1* | 2/2004 | Rekow | 701/214 |
| 6,711,501 B2 | 3/2004 | McClure et al. | 701/213 |
| 6,789,014 B1* | 9/2004 | Rekow et al. | 701/214 |
| 6,804,587 B1* | 10/2004 | O Connor et al. | 701/26 |
| 6,865,465 B2 | 3/2005 | McClure | 701/50 |
| 6,876,920 B1 | 4/2005 | Mailer | 701/207 |
| 6,990,399 B2 | 1/2006 | Hrazdera et al. | 701/50 |
| 7,054,731 B1* | 5/2006 | Lange et al. | 701/50 |
| 7,143,980 B2 | 12/2006 | Heller et al. | 244/136 |
| 7,162,348 B2 | 1/2007 | McClure et al. | 701/50 |
| 7,188,015 B2 | 3/2007 | Lange et al. | 701/50 |
| 7,212,938 B2 | 5/2007 | Mai | 702/104 |
| 7,225,060 B2* | 5/2007 | O'Connor et al. | 701/1 |
| 7,228,214 B2 | 6/2007 | Flann et al. | 701/50 |
| 7,263,422 B2 | 8/2007 | Lange et al. | 701/50 |
| 7,383,114 B1* | 6/2008 | Lange et al. | 701/50 |
| 7,437,230 B2* | 10/2008 | McClure et al. | 701/50 |
| 2002/0072850 A1 | 6/2002 | McClure et al. | 701/213 |
| 2004/0111202 A1 | 6/2004 | Mailer | 701/50 |
| 2004/0124605 A1 | 7/2004 | McClure et al. | 280/456.1 |
| 2004/0186644 A1* | 9/2004 | McClure et al. | 701/50 |
| 2004/0210357 A1 | 10/2004 | McKay et al. | 701/23 |
| 2006/0025894 A1* | 2/2006 | O'Connor et al. | 701/1 |
| 2006/0116798 A1 | 6/2006 | Gibson et al. | 701/26 |
| 2006/0142936 A1 | 6/2006 | Dix | 701/200 |
| 2006/0200294 A1* | 9/2006 | Scheufler et al. | 701/50 |
| 2006/0271348 A1* | 11/2006 | Rossow et al. | 703/26 |
| 2006/0282205 A1* | 12/2006 | Lange | 701/50 |
| 2007/0112493 A1 | 5/2007 | McClure et al. | 701/50 |
| 2008/0086249 A1* | 4/2008 | Lange | 701/41 |

FOREIGN PATENT DOCUMENTS

| | | |
|---|---|---|
| EP | 1756687 A1 * | 2/2007 |
| EP | 2029969 A2 * | 3/2009 |
| WO | WO 02/080652 A1 | 10/2002 |
| WO | WO 2006002360 A1 * | 1/2006 |
| WO | WO 2007145703 A2 * | 12/2007 |
| WO | WO 2007084965 A3 * | 10/2008 |

OTHER PUBLICATIONS

Broadband communications via high-altitude platforms: a survey; Karapantazis, S.; Pavlidou, F.; Communications Surveys & Tutorials, IEEE; vol. 7, Issue 1, First Qtr. 2005 pp. 2-31.*

The Sentinel-3 mission and its topography element; Mavrocordatos, C.; Berruti, B.; Aguirre, M.; Drinkwater, M.; Geoscience and Remote Sensing Symposium, 2007. IGARSS 2007. IEEE International; Jul. 23-28, 2007 pp. 3529-3532 Digital Object Identifier 10.1109/IGARSS.2007.4423607.*

TanDEM-X: A Satellite Formation for High-Resolution SAR Interferometry; Krieger, G.; Moreira, A.; Fiedler, H.; Hajnsek, I.; Werner, M.; Younis, M.; Zink, M.; Geoscience and Remote Sensing, IEEE Transactions on; vol. 45, Issue 11, Part 1, Nov. 2007 pp. 3317-3341; Digital Object Identifier 10.1109/TGRS.2007.900693.*

Application and analysis of a robust trajectory tracking controller for under-characterized autonomous vehicles; Wise, M. et al.; Control Applications, 2008. CCA 2008. IEEE International Conference on; Digital Object Identifier: 10.1109/CCA.2008.4629651 Publication Year: 2008, pp. 274-280.*

Path Error Measurement and Compensation of Precision Working Table; Cao Jun et al.; Mechatronics and Machine Vision in Practice, 2008. M2VIP 2008. 15th International Conference on; Digital Object Identifier: 10.1109/MMVIP.2008.4749572 Publication Year: 2008, pp. 429-434.*

Polarimetric Features of Oyster Farm Observed by AIRSAR and JERS-1; Seung-Kuk Lee et al.; Geoscience and Remote Sensing, IEEE Transactions on; vol. 44, Issue: 10, Part: 1; Digital Object Identifier: 10.1109/TGRS.2006.879107 Publication Year: 2006, pp. 2728-2735.*

The phase compensation scheme for multiple planar antenna on the SOTM; Qiong Wang et al.; Industrial Electronics and Applications, 2009. ICIEA 2009. 4th IEEE Conference on; Digital Object Identifier: 10.1109/ICIEA.2009.5138511 Publication Year: 2009, pp. 1815-1818.*

USPTO action papers mailed May 19, 2005 for U.S. Appl. No. 10/652,454, 13 pages.

USPTO action papers mailed Aug. 25, 2005 for U.S. Appl. No. 10/652,454, 13 pages.

USPTO action papers mailed Oct. 19, 2005 for U.S. Appl. No. 10/652,454, 3 pages.

USPTO action papers mailed Dec. 8, 2005 for U.S. Appl. No. 10/652,454, 2 pages.

USPTO action papers mailed Mar. 27, 2006 for U.S. Appl. No. 10/652,454, 4 pages.

USPTO action papers mailed Jan. 25, 2007 for U.S. Appl. No. 11/400,126, 10 pages.

USPTO action papers mailed May 21, 2007 for U.S. Appl. No. 11/400,126, 7 pages.

USPTO action papers mailed Jan. 9, 2008 for U.S. Appl. No. 11/400,126, 2 pages.

USPTO action papers mailed Apr. 1, 2008 for U.S. Appl. No. 11/400,126, 7 pages.

USPTO action papers mailed Jan. 10, 2007 for U.S. Appl. No. 11/148,870, 6 pages.

USPTO action papers mailed Jun. 8, 2007 for U.S. Appl. No. 11/148,870, 22 pages.

USPTO action papers mailed Oct. 5, 2007 for U.S. Appl. No. 11/148,870, 18 pages.

USPTO action papers mailed Dec. 13, 2007 for U.S. Appl. No. 11/148,870, 3 pages.

USPTO action papers mailed Feb. 27, 2008 for U.S. Appl. No. 11/148,870, 3 pages.

USPTO action papers mailed May 12, 2008 for U.S. Appl. No. 11/148,870, 30 pages.

Orthman Manufacturing, Inc., Lexington, Nebraska, "Home | Orthman Ag Products | Industrial Products | Industrial Products | New Product Announcements | Farm Show Schedule | Dealership Locator | Literature Room | Dealer Communcations | Tech Service | Company e-mail", 34 pages from www.orthman.com on Jul. 15-19, 2003.

Sukup Manufacturing Company, Sheffield, Iowa, "Sukup Locations Distributions Centers, From Planting to Harvest Sukup Fills Your Bin With Quality, Field Equipment, Guidance Systems, Flail Shredders, Guidance Sensing Options", 15 pages from www.sukup.com, Jul. 15-19, 2003.

G. O. Harries & B. Ambler, "Automatic Ploughing: A Tractor Guidance System Using Opto-electronic Remote Sensing Techniques and a Microprocessor Based Controller", Proc. agric. Engng. Res. (1981) 26, 33-53, British Society for Research in Agricultural Engineering © 1981, pp. 33-53.

Tri-R Innovations, Inc., Gibson City, IL, 26 pictures for Robotic Driver Model IV.

* cited by examiner

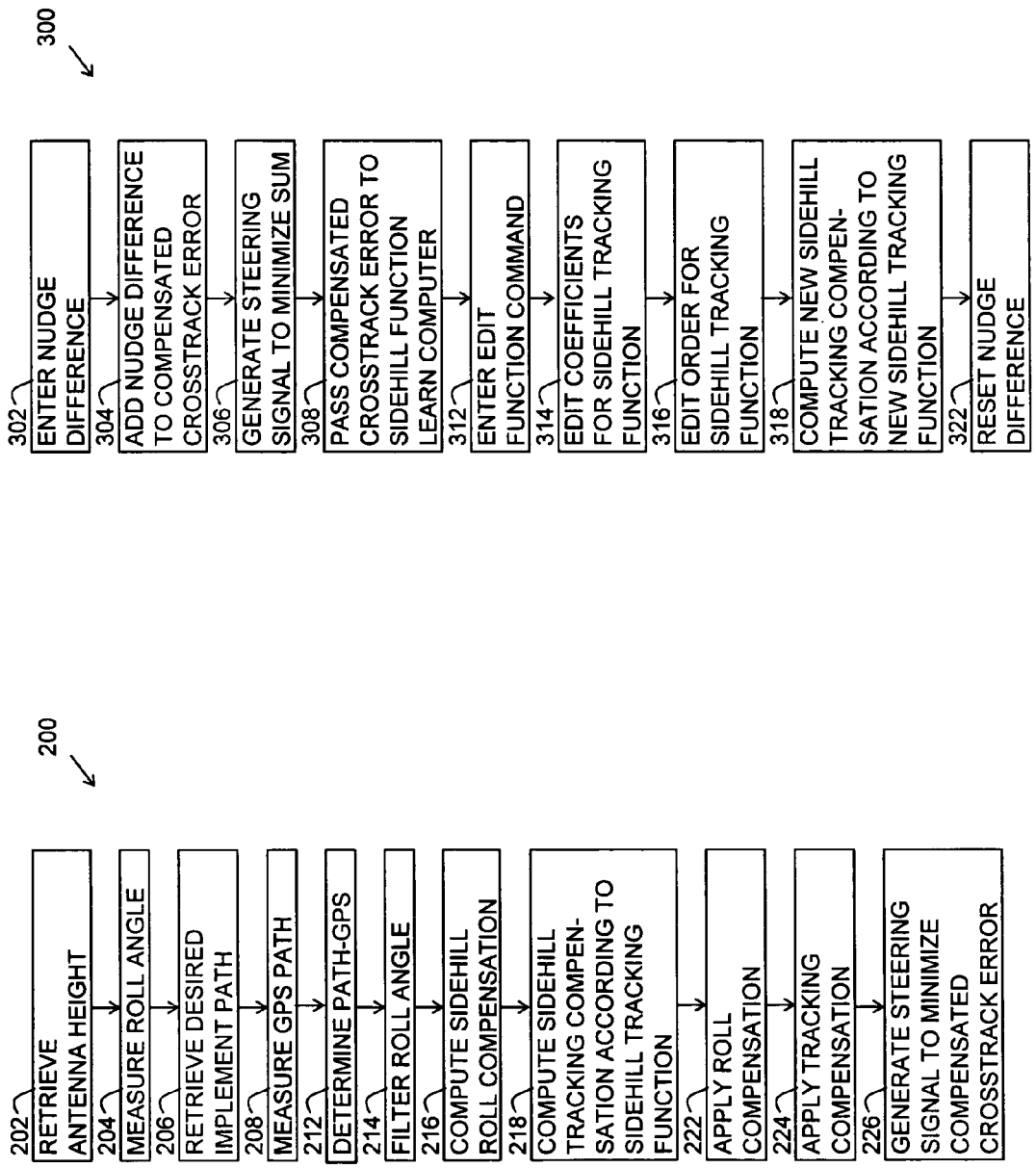

| ROLL ANGLES | MEASURED TRACKING ERRORS | COMPUTED TRACKING COMPENSATIONS 1st ORDER | COMPUTED TRACKING COMPENSATIONS 2nd ORDER | COMPUTED TRACKING COMPENSATIONS 3rd ORDER | COMPUTED TRACKING COMPENSATIONS 5th ORDER |
|---|---|---|---|---|---|
| -10 | -16 | 14.5 | 14.6 | 16.3 | 16.5 |
| -9 | -14 | 13.0 | 13.1 | 13.7 | 14.3 |
| -8 |  | 11.6 | 11.7 | 11.4 | 12.0 |
| -7 | -10 | 10.2 | 10.2 | 9.4 | 9.7 |
| -6 | -7 | 8.7 | 8.7 | 7.6 | 7.6 |
| -5 | -6 | 7.3 | 7.2 | 6.0 | 5.8 |
| -4 |  | 5.9 | 5.8 | 4.6 | 4.2 |
| -3 | -3 | 4.5 | 4.3 | 3.3 | 2.9 |
| -2 |  | 3.0 | 2.9 | 2.2 | 1.9 |
| -1 |  | 1.6 | 1.4 | 1.1 | 0.9 |
| 0 | -0.2 | 0.2 | 0.0 | 0.0 | 0.1 |
| 1 |  | -1.3 | -1.4 | -1.0 | -0.8 |
| 2 |  | -2.7 | -2.8 | -2.1 | -1.7 |
| 3 | 3 | -4.1 | -4.2 | -3.2 | -2.8 |
| 4 |  | -5.5 | -5.6 | -4.5 | -4.1 |
| 5 | 6 | -7.0 | -7.0 | -5.8 | -5.6 |
| 6 | 7 | -8.4 | -8.4 | -7.3 | -7.4 |
| 7 | 9 | -9.8 | -9.8 | -9.0 | -9.4 |
| 8 |  | -11.3 | -11.2 | -10.9 | -11.6 |
| 9 | 14 | -12.7 | -12.6 | -13.1 | -13.7 |
| 10 | 15 | -14.1 | -13.9 | -15.6 | -15.7 |
| R² VALUES |  | 0.9858 | 0.986 | 0.9981 | 0.9989 |

*TABLE 1*

FARM APPARATUS HAVING IMPLEMENT SIDEHILL DRIFT COMPENSATION

BACKGROUND OF THE INVENTION

1. Field of the Invention

The invention relates generally to farm guidance systems and more particularly to a farm vehicle guidance system using implement sidehill drift compensation with global navigation satellite system (GNSS) positioning.

2. Description of the Prior Art

Global navigation satellite systems (GNSS), especially the global positioning system (GPS), is now commonly used for steering tractors. The tractor measures its path by processing GNSS positioning signals that it receives at a GNSS antenna. An autopilot or a driver steers the tractor by minimizing a crosstrack error between the path measured for the GNSS antenna and a desired path for a farm implement that is pulled by the tractor. Recent developments of precise positioning with differential (DGPS) and real time kinematic (RTK) GPS carrier phase corrections have made it possible for farmers to map furrows within a field and then return to those furrows with the accuracy that is required for planting and cultivating.

Two-dimensional horizontal positioning is normally used with the assumption that the tractor is on horizontal ground. The horizontal assumption enables a farm system to calibrate the position of the GNSS antenna on the tractor to a position vertically above the effective point on the ground for the implement. The GNSS antenna is most advantageously mounted high on the tractor in order to have a clear line-of-sight to the GNSS satellites. However, this presents a problem called roll error when the tractor is on a sidehill because the height of the antenna and the lateral angle of the sidehill displaces the antenna's two-dimensional horizontal position to the side of the implement ground point.

Existing farm guidance systems compensate for sidehill roll error using an inclinometer for measuring a roll angle and then using the sine of the roll angle times the height of the GNSS antenna for compensating for the roll error. However, sidehills also present tracking errors due to yaw and implement drift. Yaw error results from the lead length of the GNSS antenna in front of the effective implement ground point and the uphill crabbing angle of the tractor as the tractor attempts to compensate for its sideways downhill slippage. Implement sidehill drift is due to lateral sideways downhill slippage of the implement relative to the tractor.

The sidehill errors of the roll error, implement sidehill drift and yaw error are all functions of the roll angle. Therefore, it might seem that a total sidehill compensation could be computed directly from the roll angle, the lead length of the antenna, and the use of a selected height that is different than the actual GNSS antenna height. The difference between the actual GNSS antenna height and the height that is used is selected in order to compensate for the combination of the effects of the roll error and the tracking errors due to yaw and implement sidehill drift.

Unfortunately, when this is done it causes a problem for the dynamics of automatic steering for the tractor autopilot. When the tractor is driving along its path on the field it is also rolling side to side due to uneven ground. This rolling has an accentuated effect on the GNSS-measured positions due to the height of the GNSS antenna. Tractor steering automatic steering systems have loop stability equations that are carefully designed with the use of the antenna height in the optimization of a tradeoff between having a fast response time and avoiding significant overshoots in the steering of the tractor. If the GNSS antenna height that used in the design of the equations is not the true height, the steering system causes the tractor path to be slow to respond or to have large side-to side oscillating errors.

There is a need for a farming guidance system using a tractor-vehicle mounted GNSS positioning system with roll and tracking compensations for sidehills.

SUMMARY OF THE INVENTION

The present invention is a farm guidance system using a vehicle mounted global navigation satellite system (GNSS) antenna for steering a vehicle with compensation for roll error and tracking errors on a sidehill for guiding a farm implement to a desired path.

In a first preferred embodiment, the present invention is an apparatus for steering a vehicle in order to guide a farm implement along a desired path, comprising: a compensation computer having a first sidehill computer for computing a roll height compensation from a fixed function of a roll angle of the vehicle and a height of a global navigation satellite system GNSS antenna disposed on the vehicle; and a second sidehill computer for computing a sidehill tracking compensation from a variable sidehill tracking function of said roll angle, the variable sidehill tracking function determined from a sidehill tracking error at least partly due to implement sidehill drift; and a sidehill compensator for determining a compensated crosstrack error based on the desired implement path, GNSS position measurements derived from GNSS signals received in the GNSS antenna, the roll height compensation and the tracking compensation; the compensated crosstrack error for use for steering the vehicle in order to guide the implement to the desired path.

In a second preferred embodiment, the present invention is a method for steering a vehicle in order to guide a farm implement along a desired path, comprising: computing a roll height compensation based on a fixed function of a roll angle of the vehicle and a height of a global navigation satellite system GNSS antenna disposed on the vehicle; computing a sidehill tracking compensation based on a variable sidehill tracking function of said roll angle, the variable sidehill tracking function determined from a sidehill tracking error at least partly due to implement sidehill drift; and determining a compensated crosstrack error based on the desired implement path, GNSS position measurements derived from GNSS signals received in the GNSS antenna, the roll height compensation and the tracking compensation; the compensated crosstrack error for use for steering the vehicle in order to guide the implement to the desired path.

The details of the preferred embodiments of the present invention are described in the following detailed description and illustrated in the various figures.

IN THE DRAWINGS

Figure 1:
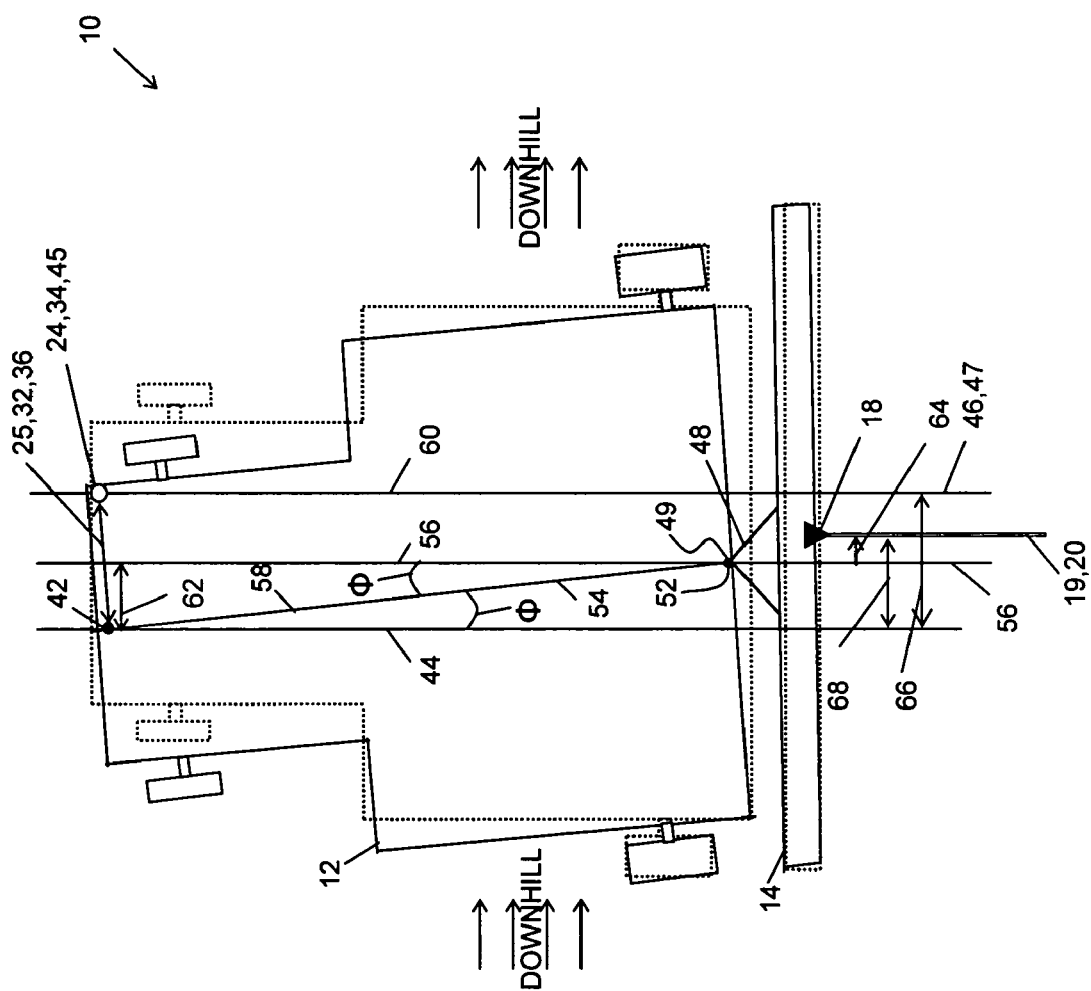
FIG. 1 is a top view ground projection of a farm guidance system having sidehill roll and tracking compensations according to the present invention.
Figure 2:
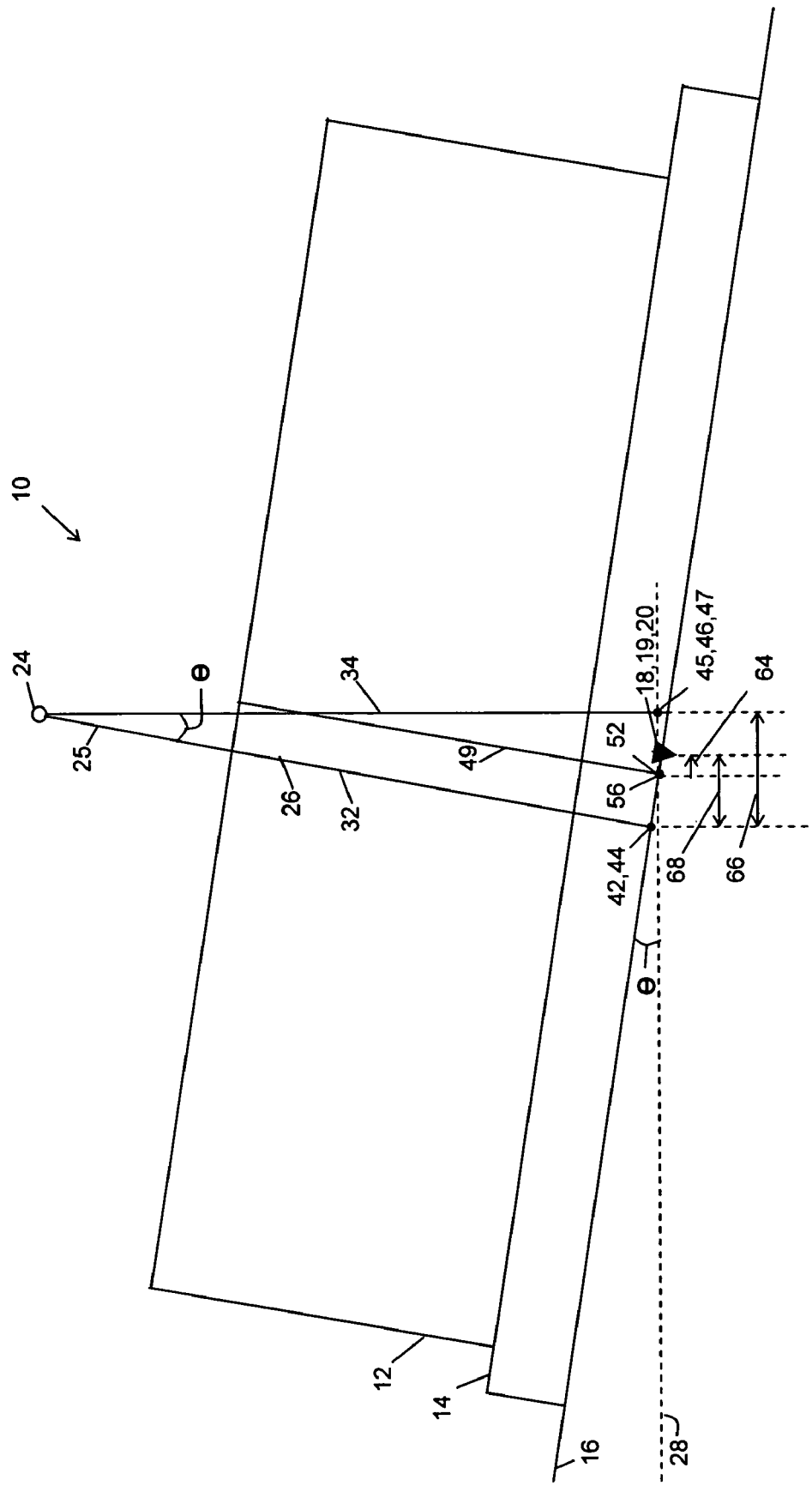
FIG. 2 is a rear view of the farm guidance system of FIG. 1.
Figure 3:
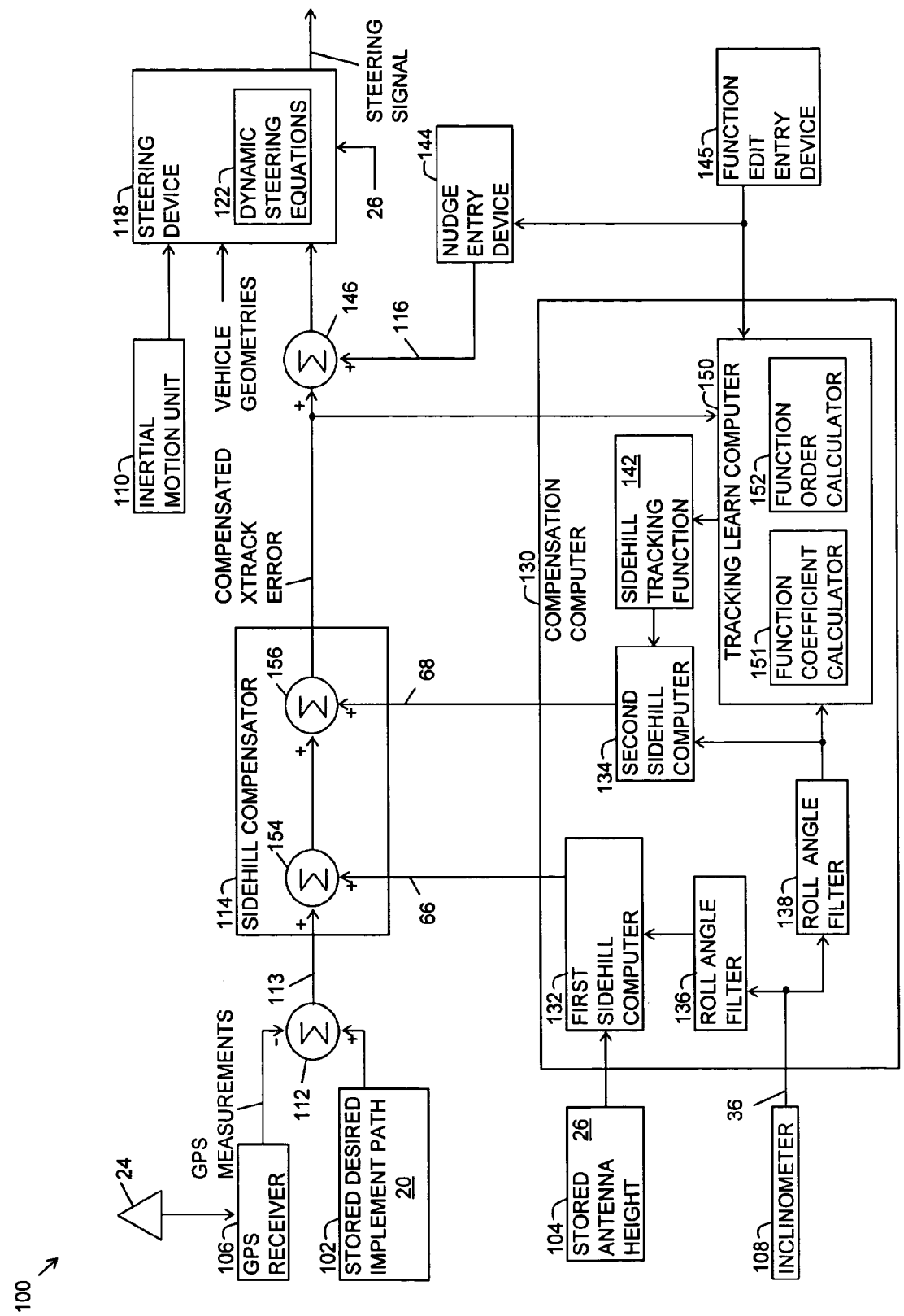
FIG. 3 is a block diagram of an apparatus of the present invention for the farm guidance system of FIGS. 1 and 2.
Figure 4:
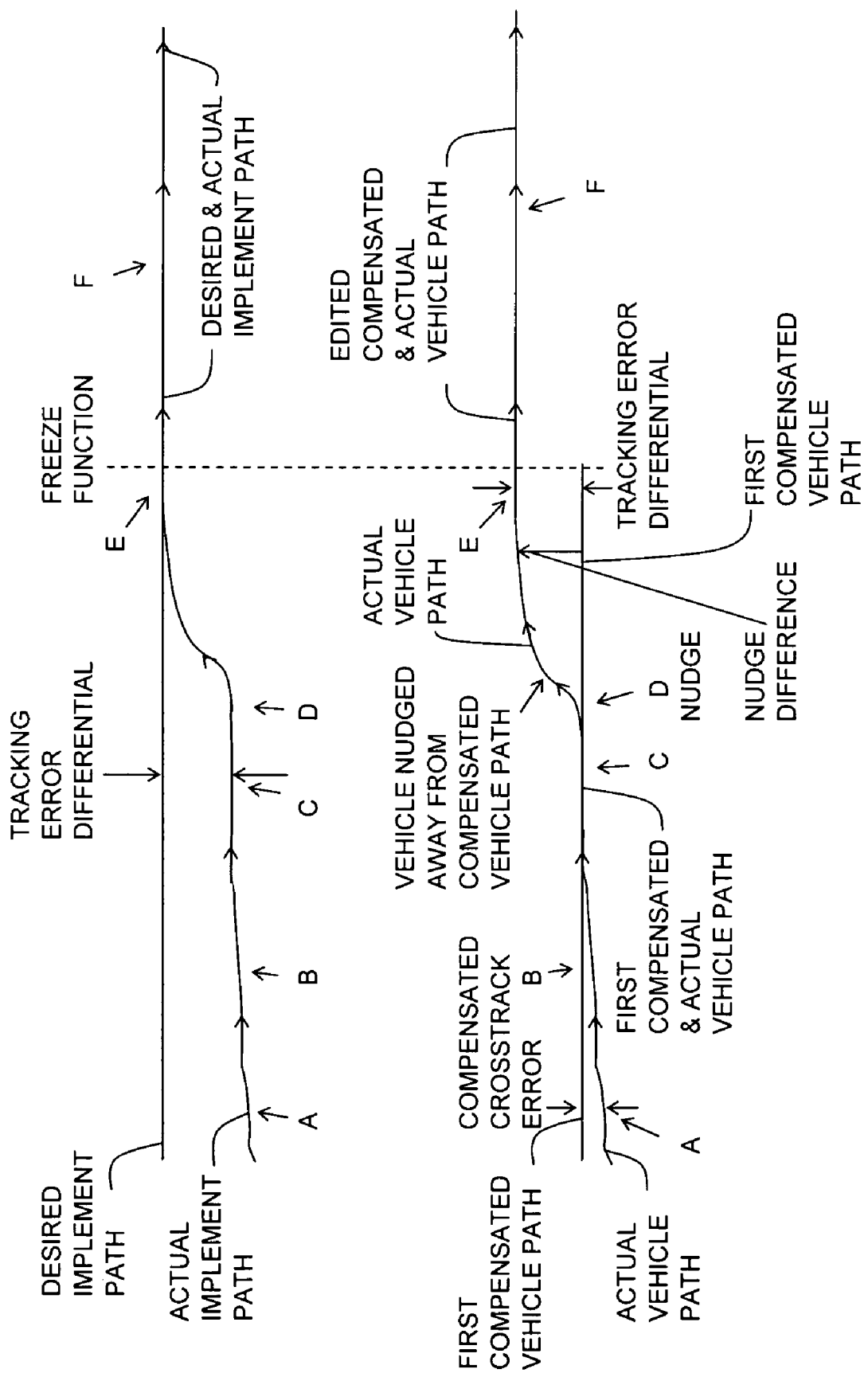
Figure 7A:
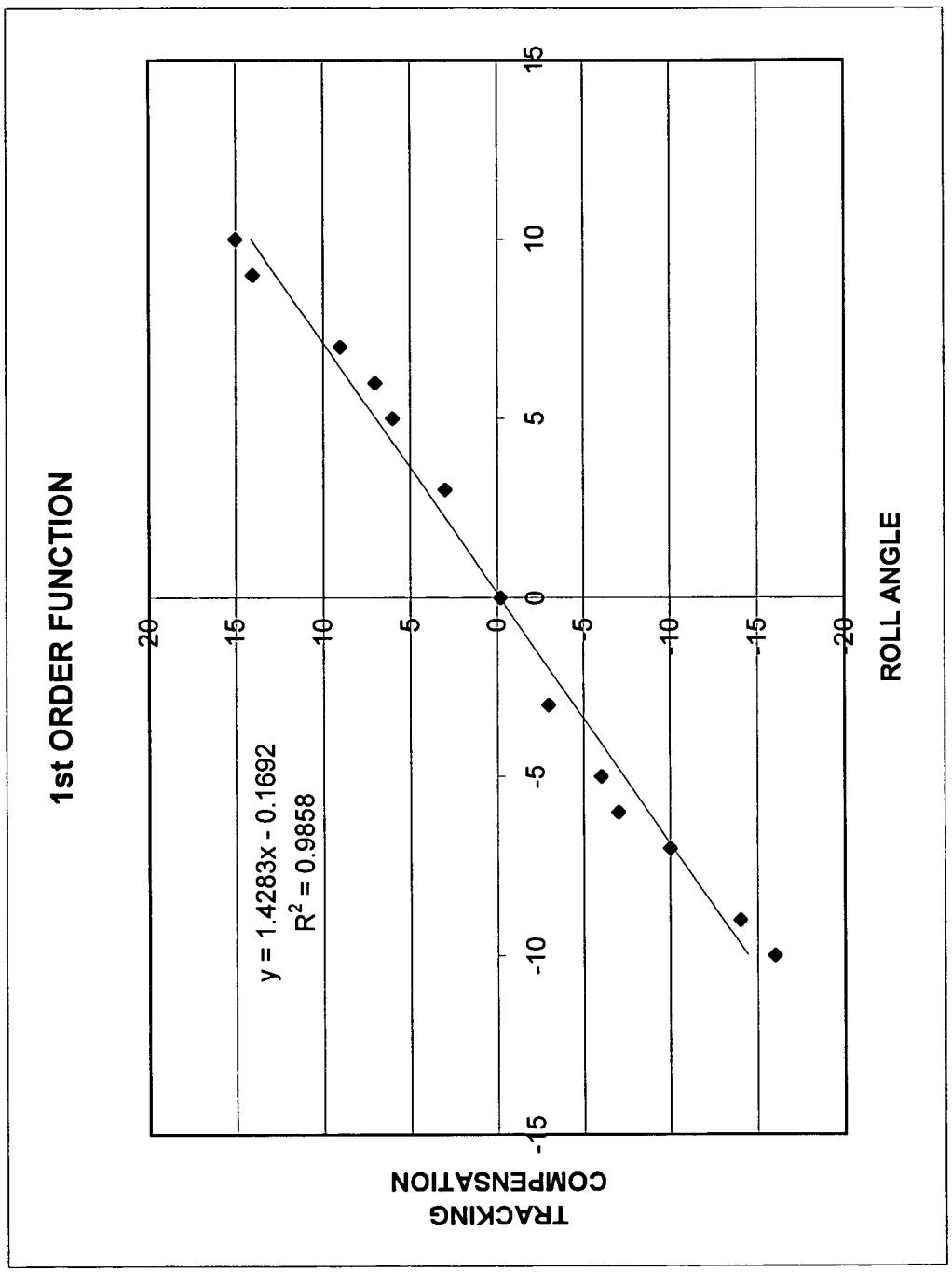
Figure 7B:
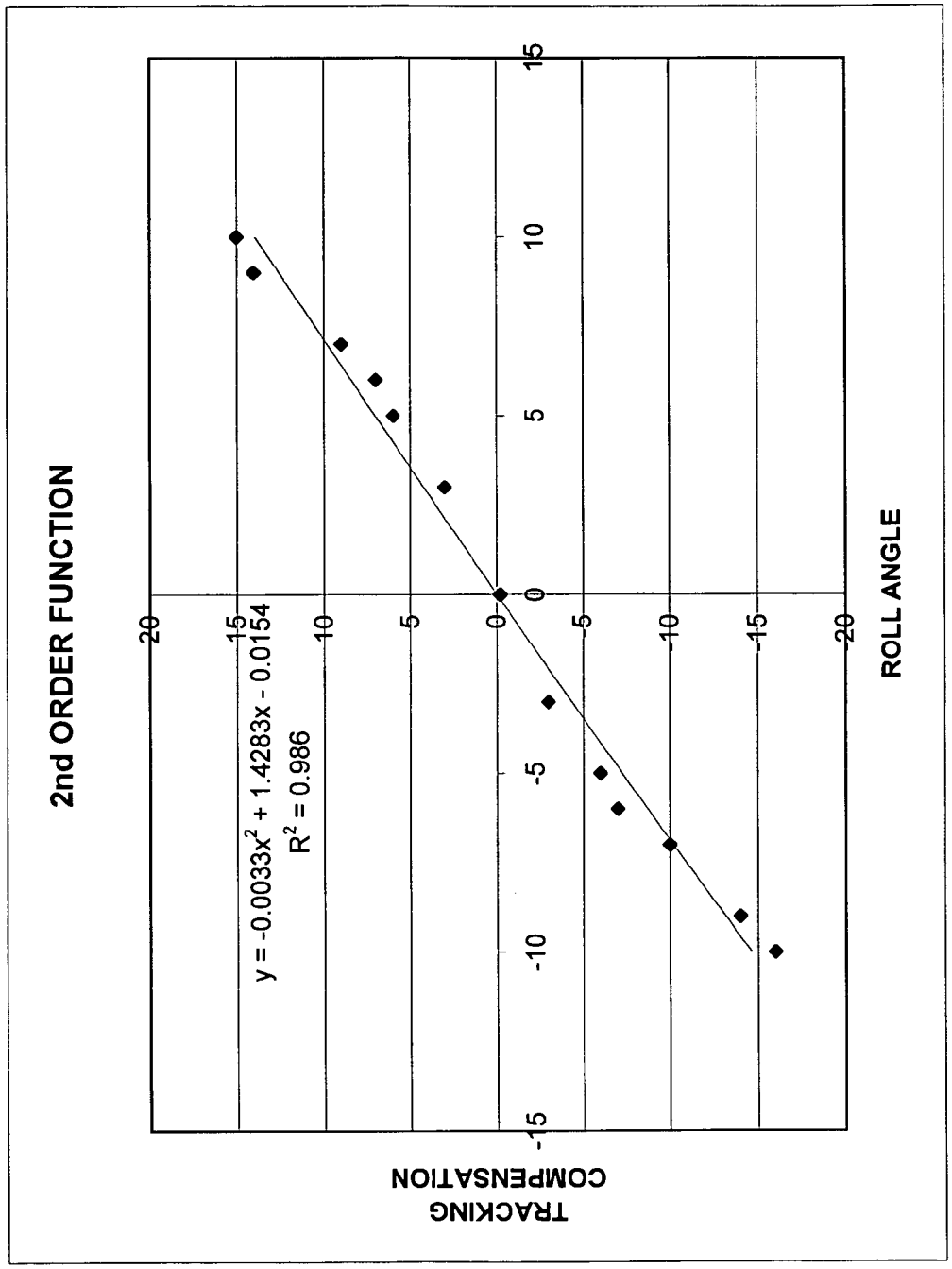
Figure 7C:
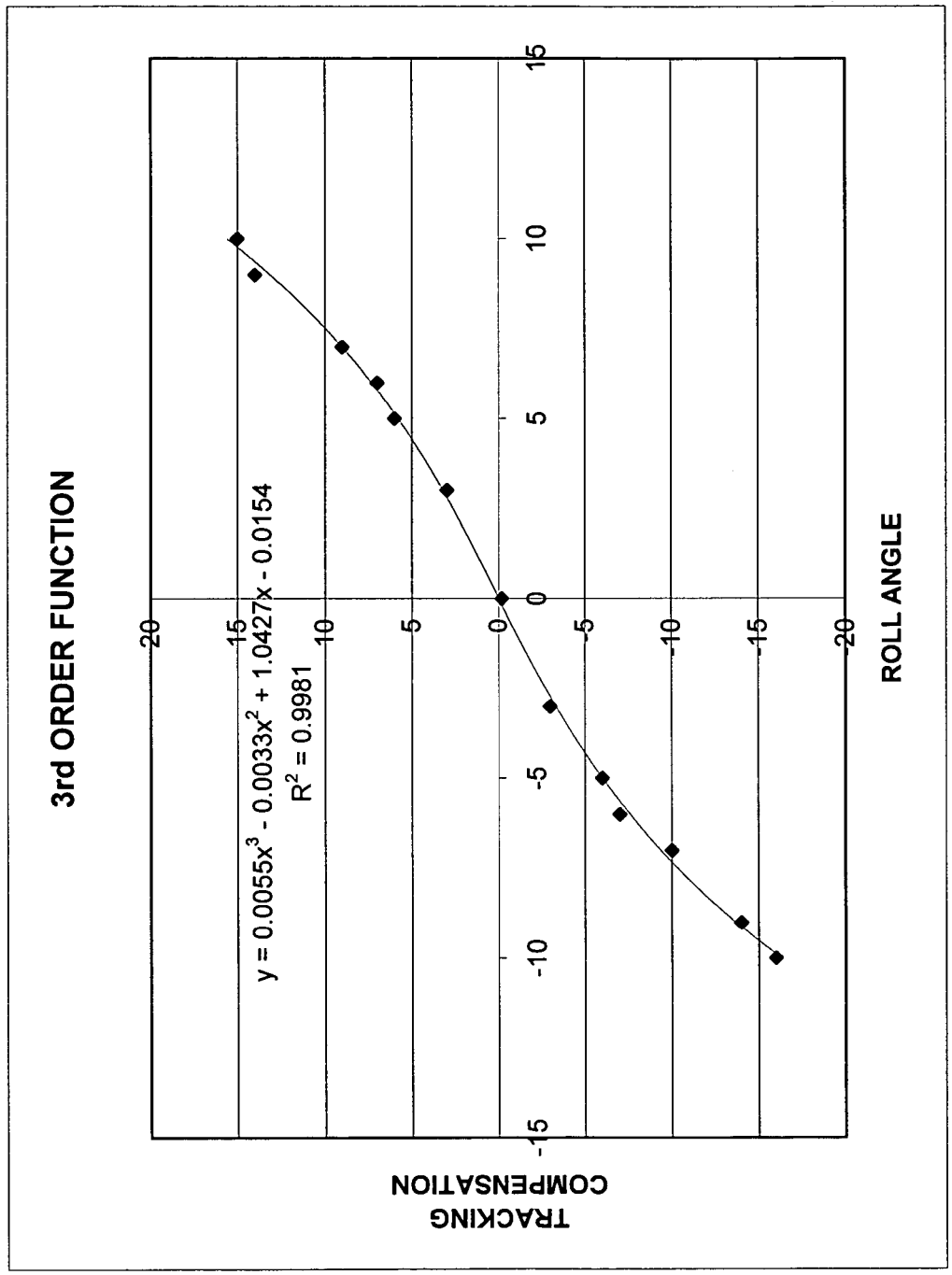
Figure 7D:
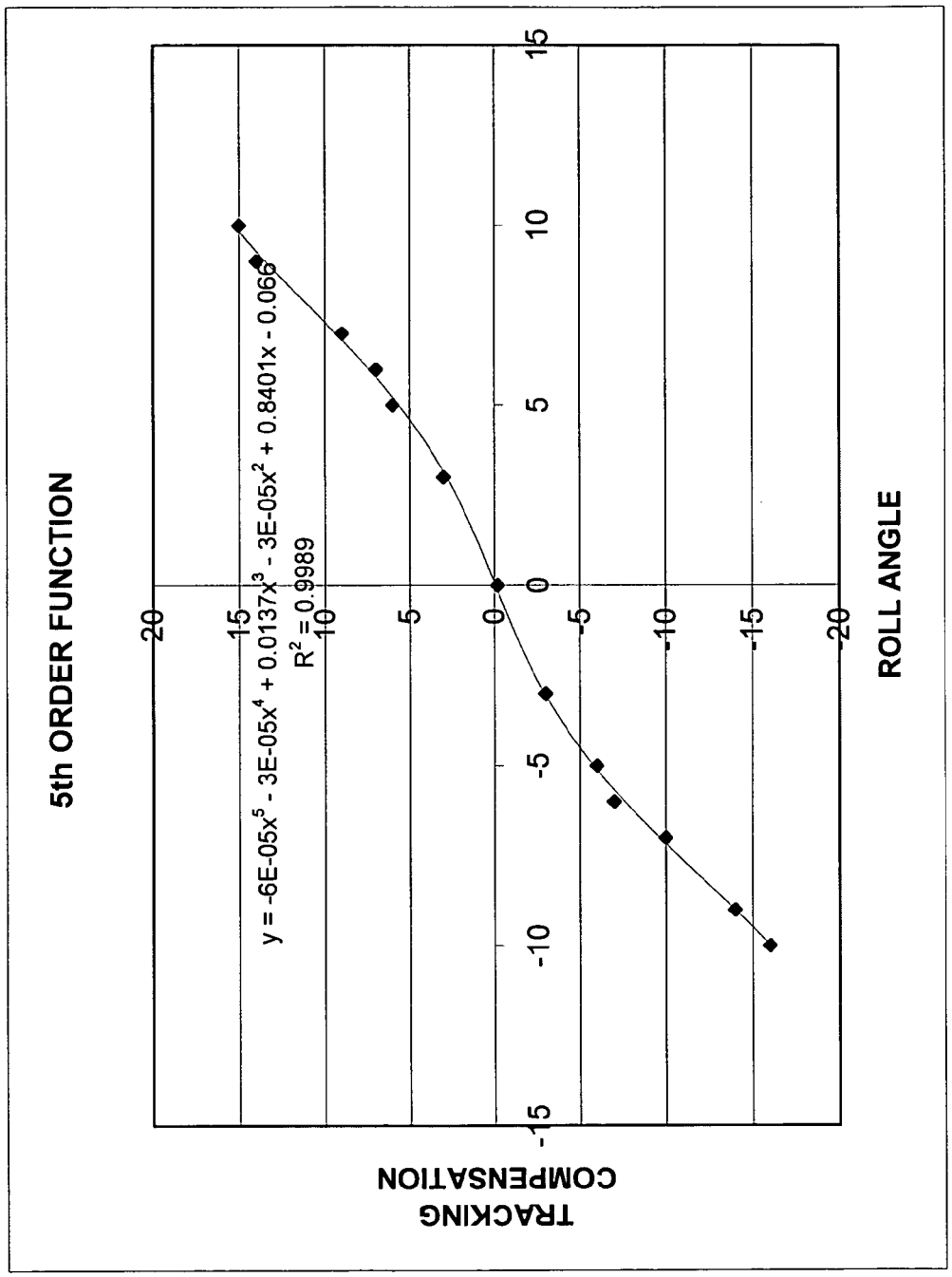

FIGS. 3A-D are block diagrams for variations of the farm apparatus of FIG. 3;

FIG. 4 illustrates a desired implement path of the farm guidance system of FIGS. 1 and 2;

FIG. 5 is a flow chart of method of the present invention for the farm guidance system of FIGS. 1 and 2;

FIG. 6 is a flow chart of a method for editing a sidehill tracking function of the present invention for computing the tracking compensation of FIGS. 1 and 2;

TABLE 1, shows exemplary tracking errors and compensations; and

FIGS. 7A, 7B, 7C and 7D are charts for first, second, third and fifth order sidehill tracking functions for the TABLE 1.

DETAILED DESCRIPTION OF THE PREFERRED EMBODIMENTS

The details of preferred embodiments for carrying out the ideas of the invention will now be presented. It should be understood that it is not necessary to employ all of these details in order to carry out the idea of the invention. Several subsets, equivalents and supersets of the embodiments described below will undoubtedly be apparent to someone skilled in the art after reading these details as within the scope of the idea of this invention.

The best mode is described in terms of the global positioning system (GPS). However, the idea may be carried out with a global navigation satellite system (GNSS) where the global positioning system (GPS), the global orbiting navigation system (GLONASS), the Galileo system or the like, or a combination of these systems provides positioning signals. It should also be noted that pseudolites may be used in place of satellites for broadcasting GNSS signals.

FIGS. 1 and 2 are top and rear views, respectively, of a farm system 10 where a vehicle 12 is pulling an implement 14 on the ground of a sidehill 16. The implement 14 has an effective position point 18. The object of a farm apparatus 100 (FIG. 3) of the present invention is to guide the implement position point 18 on an actual path 19 that matches a desired path 20. The vehicle 12 and the implement 14 have a combined yaw angle $\Phi$. The solid lines show positions and directions of the vehicle 12 and the implement 14 with the yaw angle $\Phi$. The dotted lines show the positions and the directions that the vehicle 12 and the implement 14 would have if there was no yaw angle $\Phi$.

A GPS antenna 24 mounted on a mast 25 is carried by the vehicle 12 at a height 26 above the sidehill ground 16. The vehicle 12 has a roll angle $\theta$ equal to the cross sectional angle between a horizontal plane 28 and the sidehill ground 16. An antenna perpendicular line 32 extends from the GPS antenna 24 perpendicular to the sidehill ground 16. An antenna vertical line 34 extends from the GPS antenna 24 vertically to the sidehill ground 16. The angle between the antenna perpendicular line 32 and the antenna vertical line 34 is the roll angle $\theta$. The sine of the roll angle $\theta$ times the cosine of the yaw angle $\Phi$ approximately projects the height 26 of the GPS antenna 24 as a sidehill roll error 36 perpendicular to the desired implement path 18 on the horizontal plane 28. Typically, the cosine of the yaw angle $\Phi$ is close enough to one so that its effect can be neglected in this approximation.

The antenna perpendicular line 32 intersects the sidehill ground 16 at an antenna perpendicular position 42. As the vehicle 12 drives forward, the position 42 traces an antenna perpendicular path 44 on the sidehill ground 16. The antenna vertical line 34 intersects the horizontal plane 28 at a position 45. The position 45 is the position that is measured by processing the GPS positioning signals received by the GPS antenna 24. As the vehicle 12 drives forward, the measured GPS positions 45 trace a measured GPS path 46. The measured GPS path 46 is the compensated vehicle path 47 when the vehicle 12 is correctly compensated to steer so that the implement position point 18 is on the desired implement path 20.

A hitch 48 connects the implement 14 to the vehicle 12 on a center line 49 that bisects the vehicle 12 at the center rear of the vehicle 12. The intersection of the center line 49 and the sidehill ground 16 is a hitch center ground position 52. The vehicle 12 has a fore-aft center line 54 passing through the antenna perpendicular position 42 and the hitch center ground position 52. As the vehicle 12 drives forward, the hitch center ground position 52 traces a hitch center path 56 on the sidehill ground 16. The hitch center path 56 and the antenna perpendicular path 44 are parallel but offset by a yaw error 62.

The distance between the antenna perpendicular position 42 and the hitch center ground position 52 is an antenna lead length 58. The angle between the vehicle fore-aft center line 54 and the hitch center path 56 is the yaw angle $\Phi$. The sine of the yaw angle $\Phi$ times the cosine of the roll angle $\theta$ approximately projects the antenna lead length 58 perpendicular to the desired implement path 20 on the horizontal plane 28 as the yaw error 62. Typically, the effect of the cosine of the roll angle is $\theta$ is close enough to one so that its effect can be neglected in this approximation. The yaw error 62 is also known as a crabbing error because it results from the vehicle 12 moving in a direction to the side of the direction that it is pointed in the way that a crab moves.

As the vehicle 12 moves forward on the sidehill, the implement 14 slides downhill by an implement sidehill drift error 64. The vehicle navigation apparatus 100 (FIG. 3) of the present invention computes a geometric roll height compensation 66 to compensate for the roll error 36 and an empirical tracking compensation 68 to compensate for the sum of the yaw error 62 and the implement sidehill drift 64.

For the convenience of the reader, the references identification numbers for FIGS. 1 and 2 are listed below.

system, 10
vehicle, 12
implement, 14
sidehill ground, 16
effective implement position point, 18
implement actual path, 19
desired implement path, 20
yaw angle, $\Phi$
GPS antenna, 24
mast, 25
height, 26
roll angle, $\theta$
horizontal plane, 28
antenna perpendicular line, 32
antenna vertical line, 34
sidehill roll error, 36
antenna perpendicular position, 42
antenna perpendicular path, 44
ground GPS measured position, 45
GPS measured path, 46
compensated vehicle path, 47
hitch, 48
vehicle center line, 49
hitch center ground position, 52
vehicle fore-aft center line, 54
hitch center path, 56
antenna lead length, 58
yaw error, 62
implement sidehill drift, 64
roll height compensation, 66
tracking compensation, 68

FIG. 3 is a block diagram of the farm apparatus of the present invention referred to by the reference number 100. Data for the desired implement path 20 is stored in a memory 102. Data for the antenna height 26 is entered by a provider or user of the vehicle 12 and then stored in a memory 104. The GPS antenna 24 receives GPS signals broadcast by GPS satellites and passes the signals to a GPS receiver 106. The GPS receiver 106 uses the GPS signals for measuring GPS-based positions of the GPS antenna 24. Preferably, the GPS receiver 106 is equipped for precise positioning using differential GPS or real time kinematic (RTK) GPS techniques. An inclinometer 108 is mounted on the vehicle 12 for providing the roll angle θ described above for FIGS. 1 and 2. The inclinometer 108 may be a part of an inertial motion unit 110.

A crosstrack summer 112 determines a raw crosstrack error or path-GPS difference 113 for the difference between the desired implement path 20 and the measurements of the GPS-based positions for the GPS measured path 46. A sidehill compensator 114 compensates for the roll error 36, the yaw error 62 and the implement drift error 64 by adding the roll height compensation 66 and the tracking compensation 68 to the path-GPS difference 113 in order to provide a compensated crosstrack error. In normal operation (with no nudge difference 116) a steering device 118 displays the compensated crosstrack error to a driver and/or provides a steering signal to an autopilot to steer the vehicle 12 in order to minimize the compensated crosstrack error. While the vehicle steering is being nudged, the steering device 118 operates on the compensated crosstrack error plus the nudge difference 116.

The inertial motion unit 110 measures the motion of the vehicle 12 and passes the motion measurements to the steering device 118. The motion measurements may include but are not limited to pitch angle, roll angle, yaw angle, rate of change of pitch angle, rate of change of yaw angle, rate of change of roll angle, rate of change of yaw angle, speed, acceleration and direction. The inclinometer 108 may be a part of the inertial motion unit 110 for providing the roll angle 36. The steering device 118 includes dynamic steering equations 122. The dynamic steering equations 122 use the motion measurements from the inertial motion unit 110, Doppler GNSS measurements from the GPS receiver 106, the height 26 and other geometric information about the vehicle 12, such as the antenna lead length 58 and the wheel base of the vehicle 12, together with the compensated crosstrack error for providing the steering signal.

The farm apparatus 100 includes a compensation computer 130 including first and second sidehill compensation computers 132 and 134, and second roll angle filters 136 and 138. The roll angle filters 136 and 138 filter the roll angle θ measured by the inclinometer 108 for providing time constants in the range of ½ to 1½ seconds, preferably about one seconds. The first sidehill computer 132 uses a fixed function of the roll angle θ and the true height 26 of the GNSS antenna 24 for computing the roll height compensation 66 with trigonometry and geometry. In a preferred embodiment the roll height compensation 66 is computed by the first sidehill computer 132 by multiplying the antenna height 26 by the sine of the filtered roll angle θ.

A sidehill tracking function 142 is stored in a memory in the form of one or more lookup tables or equations or a combination of lookup tables and equations. The filtered roll angle θ is applied to the sidehill tracking function 142 as an independent variable in an equation and/or an entry into a table for computing the sidehill tracking compensation 68. Equations may be used for interpolation or extrapolation from a lookup table. The height 26 is not used in the sidehill tracking function 142. The roll filters 136 and 138 may be disposed for filtering the roll height compensation 66 and the tracking compensation 68.

The sidehill tracking function 142, abbreviated STF may take the form of an equation having an order of one, that is $STF=A_0+A_1 f(\theta)$ where $A_0$ and $A_1$ are coefficients of the sidehill tracking function 142 and $f(\theta)$ is a function of the filtered roll angle θ, preferably the sine of the filtered roll angle θ. However, the function 142 is expected to take the form of an equation having an order greater than one. In general, the $STF=A_0+A_1 f(\theta)+A_2 f^2(\theta)+A_3 f^3(\theta)+\ldots$ where $A_0, A_1, A_2, A_3$ and so on, are the coefficients of the sidehill tracking function 142, $f(\theta)$ is a function of the filtered roll angle θ, preferably the sine of the filtered roll angle θ, and the exponents 2, 3 and so on, are the square, cube, and so on of the function $f(\theta)$.

The sidehill tracking function 142 is a variable function that is determined empirically for the particular vehicle 12 and implement 14 in order to provide the tracking compensation 68 that compensates for at least one and preferably several roll angles θ. In order to aid in this determination a nudge entry device 144 is provided. The driver of the vehicle 12 uses the nudge entry device 144 to nudge the steering of the vehicle 12 until the actual implement path 19 aligns with the desired implement path 20. Then the driver activates a function edit entry device 145 to edit the function 142 to provide a new tracking compensation 68 for the current filtered roll angle θ so that second sidehill computer 134 computes the new sidehill tracking compensation 68 that causes the vehicle 12 to be steered to path to which it was nudged.

In the empirical determination of the sidehill tracking function 142, weighted averaging and curve fitting may be used. For weighted averaging the most recent determinations are given more weight than older determinations for editing the sidehill tracking function 142. It may be desirable to edit the sidehill tracking function 142 so that the function 142 provides the tracking compensation 68 that as nearly as possible exactly compensates the path-GPS difference 113 at the filtered roll angle θ for the most recent function edit entry. When there is more independent data than the order of the function 142, curve fitting may use overdetermination mathematical techniques, such at least squares error allocation, for determining the coefficients of the function 142.

In order to nudge the vehicle 12 to the left or right, a driver operates a nudge entry device 144. The nudge entry device 144 provides a nudge difference 116 to a nudge summer 146. The nudge summer 146 adds the nudge difference 116 to the compensated crosstrack error for providing steering input to the steering device 118. One effect of the nudge difference 116 is to steer the vehicle 12 so that the GPS measured path 46 and the compensated vehicle path 47 (the path that would be steered by minimizing the compensated crosstrack error) differ by the nudge difference 116.

Because the vehicle 12 is steered to minimize the sum of the nudge difference 116 and the compensated crosstrack error, the compensated crosstrack error will take on the value of the negative of the nudge difference 116. This value is passed to a sidehill tracking learn computer 150. The sidehill tracking learn computer 150 uses the current compensated crosstrack error and the current filtered roll angle θ for editing a duplicate copy of the sidehill tracking function 142 so that the duplicate copy would provide the new tracking compensation 68 that would bring the compensated crosstrack error to zero for the current path of the vehicle 12. The tracking learn computer 150 includes a function coefficient calculator 151 for calculating the coefficients of the sidehill tracking function 142 and a function order calculator 152 for calculating the order of the sidehill tracking function 142.

Sighting astern, when the driver sees that the actual implement path 19 aligns with the desired implement path 20, the driver activates the function edit entry device 145. The function edit entry device 145 passes a function freeze signal to the tracking learn computer 150 and the nudge entry device 144. When the function freeze signal is received, the tracking learn computer 150 enters the edited copy into the sidehill tracking function 142 and the nudge entry device 144 resets the nudge difference 116 to zero. The compensated crosstrack error is now near zero for the correct steering of the vehicle 12 and the steering device 118 steers the vehicle 12 for minimizing the compensated crosstrack error. The vehicle 12 is now steered by the compensated crosstrack error to the compensated vehicle path 47 that causes the actual implement path 19 to match or nearly match the desired implement path 20. It may be noted that the empirical determination of the sidehill tracking function 142 compensates for the second order effect of the cosine of the yaw angle for the computation of the roll height compensation 66.

The sidehill compensator 114 includes first and second compensation summers 154 and 156. The first compensation summer 154 adds the roll height compensation 66 to the path-GPS 113 difference for providing an intermediate crosstrack error. The second compensation summer 156 adds the sidehill tracking compensation 68 to the intermediate crosstrack error for providing the compensated crosstrack error. It should be noted that the first and second compensation summers 154 and 156 may be in either order. Further, it should be noted that the sidehill roll and tracking compensations may be added together and the sum added to the path-GPS difference 113 for providing the compensated crosstrack error.

FIGS. 3A-3D show variations for making the roll and tracking compensations 66 and 68. Either or both of the roll and tracking compensations 66 and 68 may be applied directly to the desired implement path 20 for providing a compensated desired implement path. Or, either or both of the roll and tracking compensations 66 and 68 may be applied directly to the GPS measurements for providing compensated GPS measurements. Further, the roll and tracking compensations 66 and 68 may be applied in either order; that is either one may be applied before the other.

Figure 3A:
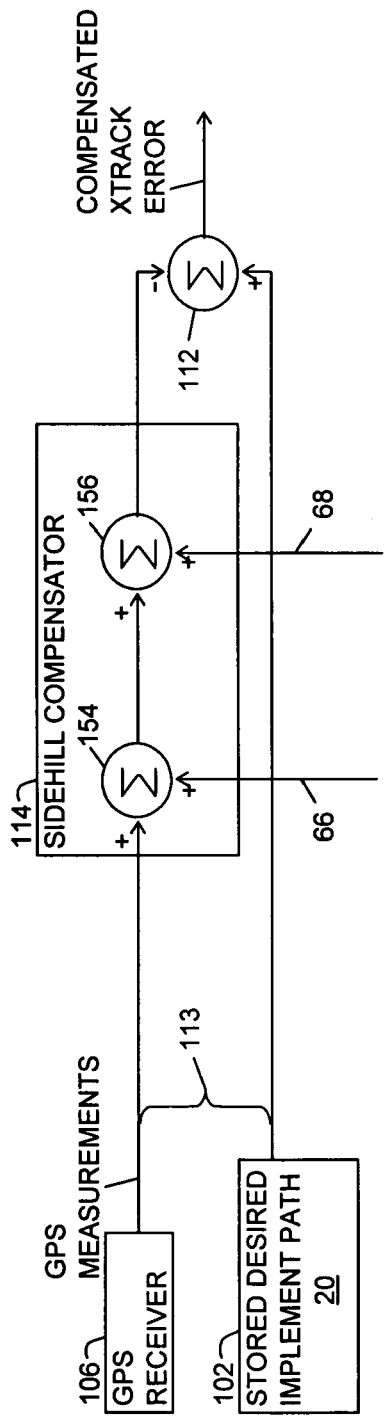
Figure 3B:
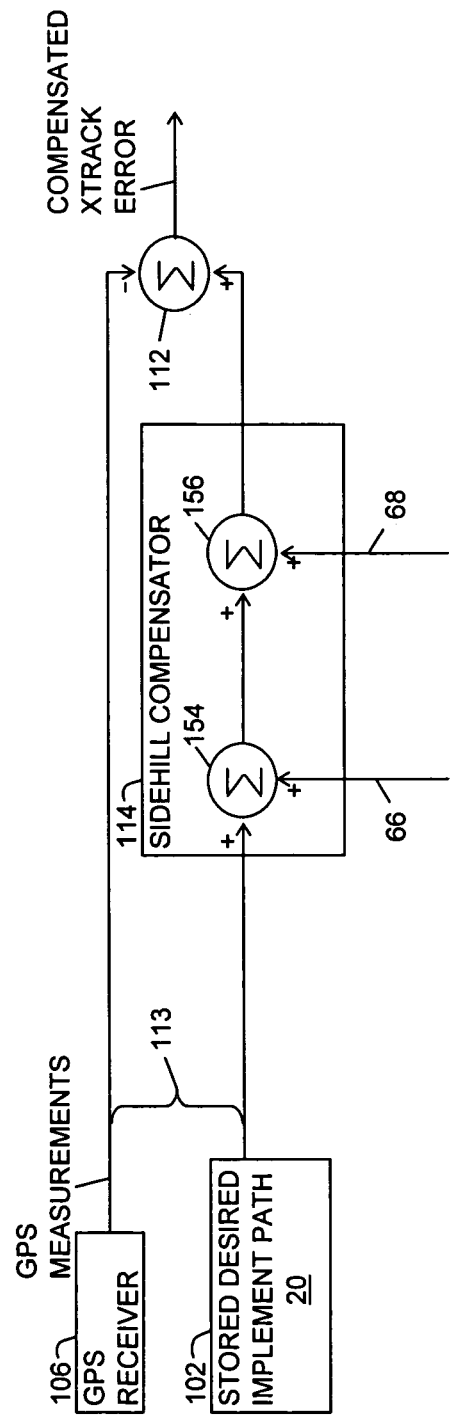

In FIG. 3A, the roll and tracking compensations 66 and 68 are applied to the GPS measurements and the crosstrack summer 112 compares the roll and tracking compensated GPS measurements to the desired implement path 20 for providing the compensated crosstrack error. In FIG. 3B, the roll and tracking compensations 66 and 68 are applied to the desired implement path and the crosstrack summer 112 compares the roll and tracking compensated desired implement path to the GPS measurements for providing the compensated crosstrack error. It is noted that the path-GPS difference (raw crosstrack error) 113 does not need to be explicitly measured in the apparatus 100.

Figure 3C:
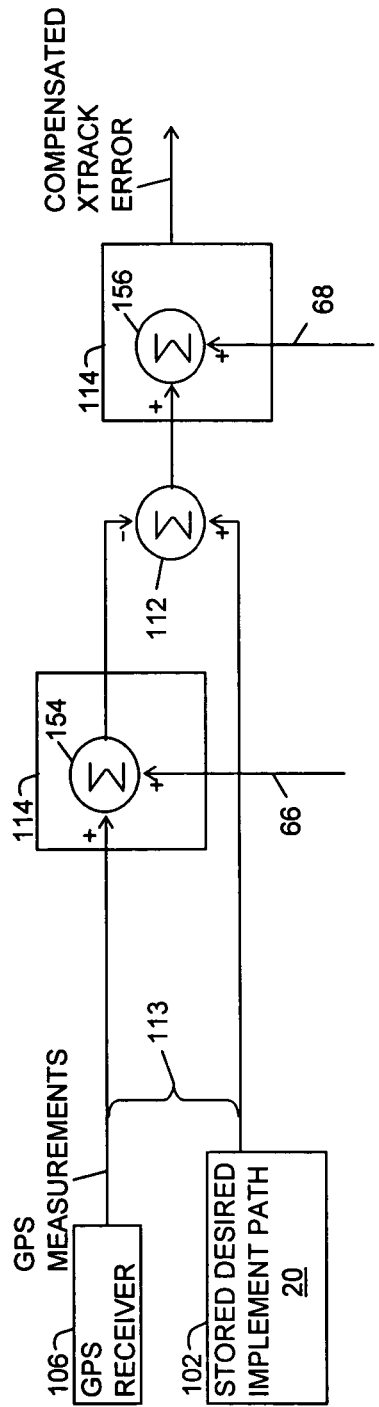

In FIG. 3C, the roll height compensation 66 is applied to the GPS measurements and the crosstrack summer 112 compares the roll compensated GPS measurements to the desired implement path 20 for providing an intermediate crosstrack error. The intermediate crosstrack error is compensated with the tracking compensation 68 for providing the compensated crosstrack error. Or, the roll and tracking compensations may be reversed so that, the crosstrack summer 112 compares tracking compensated GPS measurements to the desired implement path 20 for providing an intermediate crosstrack error and the intermediate crosstrack error is compensated with the roll height compensation 66 for providing the compensated crosstrack error.

Figure 3D:
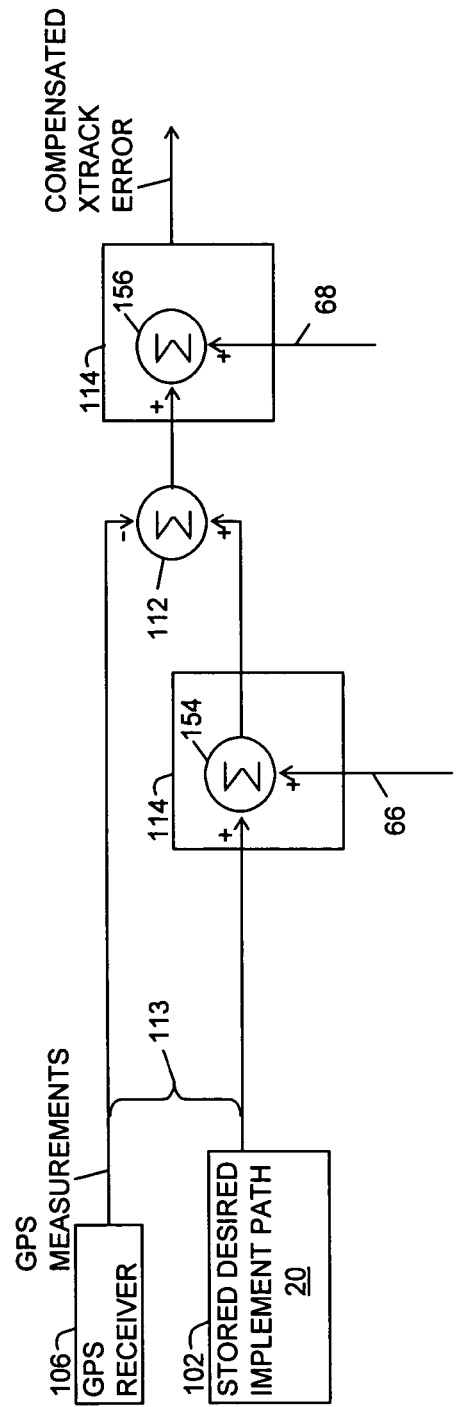

In FIG. 3D, the roll height compensation 66 is applied to the desired implement path and the crosstrack summer 112 compares the roll compensated desired implement path to the GPS measurements for providing an intermediate crosstrack error. The intermediate crosstrack error is compensated with the tracking compensation 68 for providing the compensated crosstrack error. Or, the roll and tracking compensations may be reversed so that, the crosstrack summer 112 compares a tracking compensated desired implement path to the GPS measurements for providing an intermediate crosstrack error and the intermediate crosstrack error is compensated with the roll height compensation 66 for providing the compensated crosstrack error.

FIG. 4 shows an example of the vehicle and implements paths as the vehicle 12 tows the implement 14. At a point A, for whatever reason, the actual vehicle path differs from a first compensated vehicle path by a non-zero value for the compensated crosstrack error. In normal steering operation, in a section B, feedback through the apparatus 100 steers the vehicle 12 to reduce the value of the compensated crosstrack error until at a point C the error is very small and the actual and first compensated vehicle paths are very close. However, it is noted at the point C in the example that the actual implement path does not match the desired implement path 20.

A tracking error differential between the actual and desired implement path is taken by the apparatus 100 to be due to the combination of the yaw error and implement sidehill drift that is not properly compensated by the current tracking compensation 68 that is provided by the current sidehill tracking function 142 for the current roll angle θ. This tracking error differential is corrected by editing the function 142. Note that the function relating the roll height compensation 66 to the roll angle θ and the GNSS antenna height 26 does not change.

At a point D, the driver nudges the actual vehicle path away from the compensated vehicle path until he or she sees, at a point E, that the actual implement path matches the desired implement path 20. The driver of the vehicle 12 may observe this match by sighting astern. Because the GPS measurements track the actual vehicle path, the negative of the compensated crosstrack error for the current point E is approximately equal to the nudge difference. The tracking error differential is the negative of the current compensated crosstrack error or the nudge difference. The tracking error (total) is the tracking error differential (measured from a current nudge difference or a current compensated crosstrack error) combined with the current tracking compensation 68.

At the point E the driver directs the apparatus 100 to edit the sidehill tracking function 142 based on the measurement of the current compensated crosstrack error (or nudge difference) and the current roll angle θ so that the edited sidehill tracking function 142 provides a new sidehill tracking compensation 68 that eliminates or reduces the tracking error and brings the compensated crosstrack error to zero or near zero for the current actual vehicle path. At this point the steering nudge difference is reset to zero. In a section F, in normal steering operation, the apparatus 100 uses the new (edited) sidehill tracking function 142 for providing the tracking compensation 68 for providing the compensated crosstrack error for steering the vehicle 12 to an edited compensated vehicle path so that the implement 14 is guided to an actual implement path that aligns with the desired implement path 20.

FIG. 5 is a flow chart of a method of the present invention for steering a farm vehicle in order to pull an implement along a desired implement path. The steps of the method may be incorporated in a computer-readable medium 200 as an article of manufacture where the medium 200 may be read by the computer in order to direct an apparatus to carry out the steps. In a step 202 the height of the GPS antenna is retrieved from memory. This height has been entered by a manufacturer or user for the true height of the antenna above ground on the vehicle on which the GPS antenna is carried. In a step 204 a roll angle θ is measured by an inertial motion unit or an inclinometer. In a step 206 data is retrieved for the desired geographical implement path. In a step 208 a GPS receiver uses GPS signals received by the GPS antenna for measuring GPS-based positions for determining a GPS measured path.

The path-GPS difference between the desired implement path and the measured GPS path may be determined in a step 212. In a step 214, the roll angle θ is filtered. In a step 216, geometry and trigonometry are used for computing a sidehill roll height compensation from the antenna height and a filtered roll angle θ. In a step 218 a filtered roll angle θ is used in a sidehill tracking function for computing a sidehill tracking compensation. In a step 222 the sidehill roll height compensation is applied to the path-GPS difference for providing an intermediate crosstrack error. In a step 224 the sidehill tracking compensation is applied to the intermediate crosstrack error for providing a compensated crosstrack error. It should be noted that the roll and tracking compensation may be applied in either order, and that either the roll height compensation or the tracking compensation or both may be applied to the GPS measurements or the desired implement path or the difference between the GPS measurements and the desired implement path. Then, in a step 226 the compensated crosstrack error is used for determining a steering signal for steering the vehicle in order to minimize the compensated crosstrack error.

FIG. 6 is a flow chart of a method of the present invention for editing a sidehill tracking function. The steps of the method may be incorporated in a computer-readable medium 300 as an article of manufacture where the medium 300 may be read by the computer in order to direct an apparatus to carry out the steps. At the start, the vehicle is being steered for minimizing the compensated crosstrack error. In a step 302 a user enters a nudge difference for steering the vehicle at a lateral offset to the compensate vehicle path that is computed with the current roll and tracking compensations. In a step 304 the compensated crosstrack error and the nudge difference are added.

The vehicle steers in a step 306 for minimizing the sum of the compensated crosstrack error and the nudge difference. The vehicle will be steered so that the current value of the compensated crosstrack error is the negative of the nudge difference. In a step 308 the value for the compensated crosstrack error (or the nudge difference) is passed to a sidehill tracking learn computer. In a step 312 a function freeze signal is entered by the user. It is intended that the user gives the function freeze signal when the actual implement path and the desired implement path are aligned.

The sidehill tracking learn computer uses the current value for the compensated crosstrack error (or nudge difference) and the filtered roll angle θ for editing the sidehill tracking function so that the edited sidehill tracking function of the current filtered roll angle θ determines a new sidehill tracking compensation that cancels the current compensated crosstrack error (or nudge difference). This can be done by editing the coefficients of the sidehill tracking function as shown in a step 314 or by editing the order of the sidehill tracking function as shown in a step 316. In a step 318 the nudge difference is reset to zero, the new edited sidehill tracking function is applied for providing a new tracking compensation, and the vehicle is again steered for minimizing the compensated crosstrack error.

TABLE 1 shows exemplary tracking errors for roll angles θ of −10 to +10. It should be noted that the tracking errors are path alignment errors that are not compensated by the roll height compensation 66. An entry row for a current roll angle θ and a current tracking error (measured from the current compensated crosstrack error or the nudge difference) is added to the table and the sidehill tracking function 142 is edited when the tracking learn computer 150 receives the freeze function signal. An entry row may be selectably erased. The sidehill tracking function 142 may be edited after each erasure. The units of the roll angles θ may be degrees or sine's of degrees. Other units may also be used because the coefficients of the sidehill tracking function 142 may provide compensation for whatever units are chosen. The units of the measured tracking errors and the computed tracking compensations 68 are typically inches or centimeters but may be any units of length. Tracking compensations 68 are shown for first order, second order, third order and fifth orders for the sidehill tracking function 142. Generally, R squared values increase (least squares error curve fit is improved) for each higher equation order of the function 142.

The order of the function 142 may be selected or an R squared value threshold may be selected. When an R squared threshold is selected, the tracking learn computer 150 calculates the order that is required for providing an R squared value that meets or exceeds the selected threshold. In a variation, the tracking learn computer 150 may be designed to edit the sidehill tracking function 142 to provide the tracking compensation 68 at a current roll angle θ that nearly exactly compensates the current tracking error. Generally, this will mean that other roll angles θ are less well compensated. In a further variation, the tracking learn computer 150 may be designed to edit the sidehill tracking function 142 using weighted averaging where the most recent tracking errors and corresponding roll angles θ are given more weight for editing the sidehill tracking function 142.

FIGS. 7A, 7B, 7C and 7D are charts showing measured tracking errors (diamonds) versus the negative of the calculated tracking compensations 68 (lines) for first, second, third and fifth order sidehill tracking functions 142, respectively. The roll angles θ are plotted on the horizontal axes. The tracking errors and negative of the tracking compensations 68 are plotted on the vertical axes. Equations are printed on the charts for the sidehill tracking functions 142 to show the tracking compensations 68 as "y" versus roll angles θ as "x" for first, second, third and fifth function equation orders. It should be noted that the sidehill tracking function 142 may have an order of four or a higher order than five.

In general, although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for steering a vehicle in order to guide a farm implement along a desired path, comprising:
    a compensation computer having a first sidehill computer to compute a roll height compensation from a fixed function of a roll angle of said vehicle and a height of a global navigation satellite system (GNSS) antenna disposed on said vehicle; and a second sidehill computer to compute a sidehill tracking compensation from a variable sidehill tracking function of said roll angle, said variable sidehill tracking function determined to compensate a sidehill tracking error at least partly due to implement sidehill drift; and a sidehill compensator to determine a compensated crosstrack error based on said desired implement path, GNSS position measurements derived from GNSS signals received in said GNSS antenna, said roll height compensation and said tracking compensation; said compensated crosstrack error to assist steering said vehicle in order to guide said implement to said desired path.

2. The apparatus of claim 1, wherein:
said height is the height of said GNSS antenna above ground.

3. The apparatus of claim 1, wherein:
said sidehill tracking function is configured to provide values of said tracking compensation corresponding to values of said roll angle, respectively, to said tracking error between an actual implement path and said desired vehicle path when said vehicle having said roll angle is steered to minimize said compensated crosstrack error.

4. The apparatus of claim 1, wherein:
said sidehill tracking function is configured to provide a best fit between several values of said tracking compensation computed from several values of said roll angle, respectively and values of said tracking error measured at said several values of said roll angle.

5. The apparatus of claim 1, wherein:
said steering device is configured to provide a steering signal to steer said vehicle in order to minimize said compensated crosstrack error.

6. The apparatus of claim 1, further comprising:
a roll filter to a time constant to said tracking compensation to cause said compensated crosstrack error to have a slower response to changes in said roll angle than to changes in a raw crosstrack error between said desired implement path and a GNSS-measured path determined with said GNSS position measurements.

7. The apparatus of claim 1, further comprising:
a tracking learn computer to edit said sidehill tracking function according to a current said tracking error and a current said roll angle, said edited sidehill tracking function to compute said sidehill tracking compensation to compensate for said current tracking error for said current roll angle.

8. The apparatus of claim 7, further comprising:
a function edit entry device to issue a function freeze signal to said tracking learn computer, said tracking learn computer configured to determine said current tracking error at said function freeze signal.

9. The apparatus of claim 7, wherein:
said tracking learn computer includes a function coefficient calculator to edit said sidehill tracking function by re-calculating one or more coefficients of said function.

10. The apparatus of claim 7, wherein:
said tracking learn computer includes a function order calculator to edit said sidehill tracking function by determining an order for said function.

11. The apparatus of claim 1, wherein:
a tracking learn computer for editing said sidehill tracking function for minimizing a current said compensated crosstrack error for a current path of said vehicle.

12. The apparatus of claim 1, wherein:
a tracking learn computer to edit said sidehill tracking function for a best fit of differences between several values of said sidehill tracking compensation for several values of said roll angle, respectively, and several values of said tracking error for said several values of said roll to provide a current said sidehill tracking compensation for said current roll angle.

13. The apparatus of claim 1, further comprising:
a nudge summer to add a nudge difference to said compensated crosstrack error to a current said compensated crosstrack error; and
a tracking learn computer to measure a current said tracking error using said nudge difference or said current compensated crosstrack error; and to use said current tracking error and a current said roll angle to edit said sidehill tracking function.

14. A method for steering a vehicle in order to guide a farm implement along a desired path, comprising:
computing a roll height compensation based on a fixed function of a roll angle of said vehicle and a height of a global navigation satellite system (GNSS) antenna disposed on said vehicle;
computing a sidehill tracking compensation based on a variable sidehill tracking function of said roll angle, said variable sidehill tracking function from a sidehill tracking error at least partly due to implement sidehill drift; and
determining a compensated crosstrack error based on said desired implement path, GNSS position measurements derived from GNSS signals received in said GNSS antenna, said roll height compensation and said tracking compensation; said compensated crosstrack error for use for steering said vehicle in order to guide said implement to said desired path.

15. The method of claim 14, wherein:
said height is the height of said GNSS antenna above ground.

16. The method of claim 14, further comprising:
providing said sidehill tracking function for computing values of said tracking compensation corresponding to values of said roll angle, respectively, for compensating said tracking error between an actual implement path and said desired vehicle path when said vehicle having said roll angle is steered for minimizing said compensated crosstrack error.

17. The method of claim 14, further comprising:
providing said sidehill tracking function for providing a best fit between several values of said tracking compensation computed from several values of said roll angle, respectively and values of said tracking error measured at said, several values of said roll angle.

18. The method of claim 14, further comprising:
steering said vehicle in order to minimize said compensated crosstrack error.

19. The method of claim 14, further comprising:
providing a time constant to said tracking compensation for causing said compensated crosstrack error to have a slower response to changes in said roll angle than to changes in a raw crosstrack error between said desired implement path and a GNSS-measured path determined with said GNSS position measurements.

20. The method of claim 14, further comprising:
editing said sidehill tracking function according to a current said tracking error and a current said roll angle for computing said sidehill tracking compensation for compensating for said current tracking error for said current roll angle.

21. The method of claim 20, further comprising:
issuing a function freeze signal to said tracking learn computer; and wherein:
editing said sidehill tracking function includes determining said current tracking error at said function freeze signal.

22. The method of claim 20, wherein:

editing said sidehill tracking function includes re-calculating one or more coefficients of said function.

23. The method of claim 20, wherein:

editing said sidehill tracking function includes determining an order for said function.

24. The method of claim 14, further comprising:

editing said sidehill tracking function for minimizing a current said compensated crosstrack error for a current path of said vehicle.

25. The method of claim 14, further comprising:

editing said sidehill tracking function for a best fit of differences between several values for said sidehill tracking compensation for several values for said roll angle, respectively, and several values for said tracking error for said several values of said roll angle for providing a current said sidehill tracking compensation for said current roll angle.

26. The method of claim 14, further comprising:

adding a nudge difference to said compensated crosstrack error for providing a current said compensated crosstrack error;

measuring a current said tracking error from said nudge difference or said current compensated crosstrack error; and using said current tracking error and a current said roll angle for editing said sidehill tracking function.

* * * * *